United States Patent [19]

Suzuki et al.

[11] Patent Number: 4,987,867
[45] Date of Patent: Jan. 29, 1991

[54] PISTON FOR INTERNAL COMBUSTION ENGINES

[75] Inventors: Yoshihiro Suzuki, Fukiagemachi; Toshio Ogiwara, Mochida; Masaaki Kudo, Muraoka, all of Japan

[73] Assignee: Izumi Industries, Ltd., Saitama, Japan

[21] Appl. No.: 431,765

[22] Filed: Nov. 6, 1989

[51] Int. Cl.$^5$ .............................................. F02F 3/00
[52] U.S. Cl. ................................. 123/193 P; 92/222; 92/223
[58] Field of Search .............. 123/193 P; 92/222, 223, 92/227; 277/189.5

[56] References Cited

U.S. PATENT DOCUMENTS

| | | | |
|---|---|---|---|
| 2,255,006 | 9/1941 | Graham | 92/227 |
| 2,261,405 | 11/1941 | Nicolle | 92/227 |
| 2,410,405 | 11/1946 | Cornelius | 92/223 |
| 4,008,051 | 2/1977 | Cadle | 123/193 P |
| 4,233,490 | 11/1980 | Shalai et al. | 92/222 |

FOREIGN PATENT DOCUMENTS 1237238  6/1971  United Kingdom ................. 92/222

Primary Examiner—Andrew M. Dolinar
Assistant Examiner—M. Macy
Attorney, Agent, or Firm—Jones, Day, Reavis & Pogue

[57] ABSTRACT

A piston for internal combustion engines has a piston-ring groove which is strengthened with a composite layer based on porous metal which is embedded around the piston-ring groove. The porous metal contains at least more than 10% Cr, and the volumetric ratio of the porous metal is between 8 to 70%, so that even though the engine is put in action under high heat loads, no crack is initiated in the piston.

8 Claims, 6 Drawing Sheets

Ni

Intermetallic compound layer

The rest is aluminium alloy

Intermetallic compound layer

Chromium layer
Chromium content

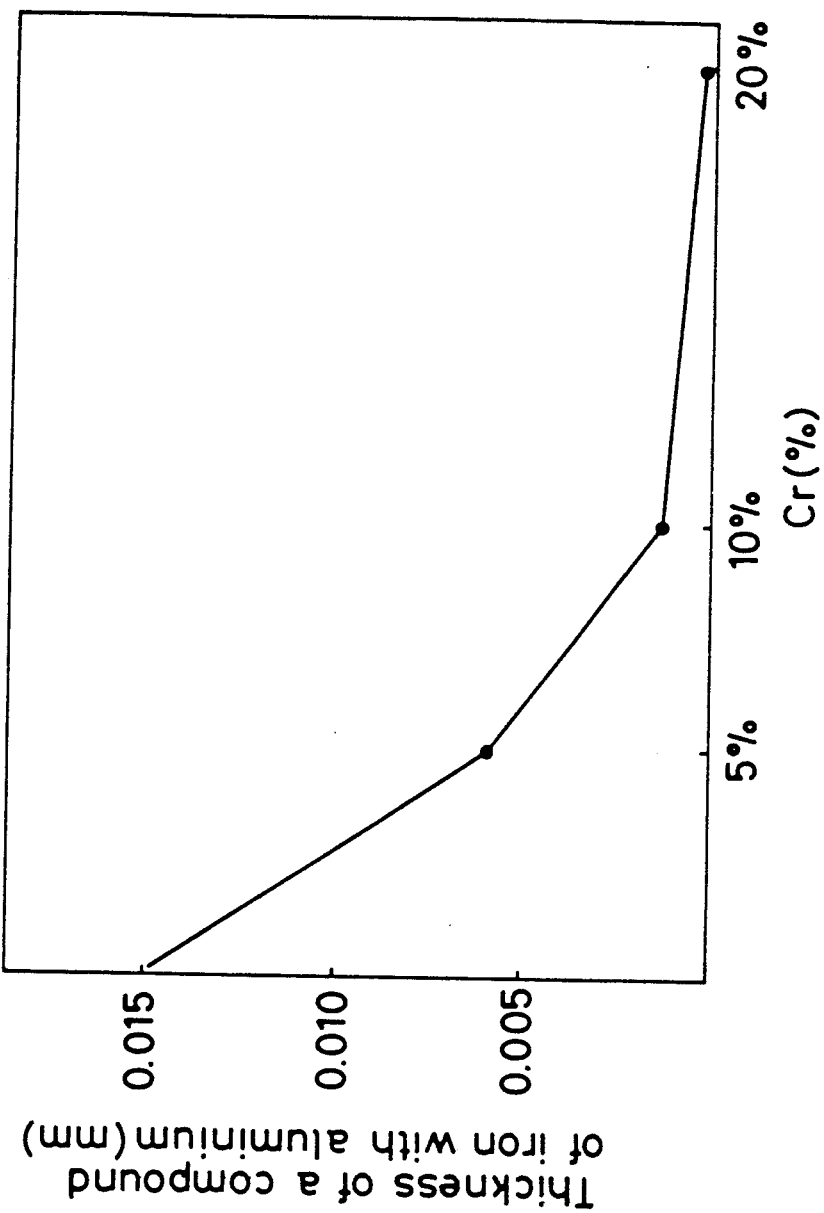

PISTON FOR INTERNAL COMBUSTION ENGINES

BACKGROUND OF THE INVENTION

1. Field of the Invention

This invention relates generally to a piston for internal combustion engines, and more particularly is directed to the piston-ring groove of a piston of aluminium alloy, which has good wear resistance.

2. Description of the Prior Art

In general, the piston-ring groove of a piston for an internal combustion engine is not only exposed to a high temperature, but also mechanically worn due to friction between the piston and a piston ring, so that blow-by is caused, and the consumption of lubricant increases. Thus, the life of the engine is shortened.

In case of a diesel engine in which abrasion on the piston-ring groove is very large, the piston is cast in special cast iron so as to reduce the abrasion. Further, it is disclosed in Japanese Laid Open Patent No. 53-31014 how to make aluminium alloy forming the piston body, penetrate into porous metal which is embedded around the piston-ring groove, when the piston is cast under high pressure.

Moreover, in Japanese Laid Open Patent Nos. 59-21393, 59-218341, and 59-212159, it is disclosed to increase the wear resistance of the piston ring groove reinforced by porous metal made of Fe, Ni, Cu or the like, in which hard intermetallic compound of porous metal and aluminium is produced by heat treatment.

The invnetors of this application found such facts that (1) the kind of the porous material influences in a process of forming an intermetallic compound of the porous material with aluminium, and (2) cracks are initiated in brittle portions of the formed intermetallic compound when the piston is repeatedly heated of long duration.

If a volumetric ratio $V_f$ of the porous metal ring is rather small, there is no detrimental effect on the piston even if the cracks are produced in the intermetallic compound. However, if the volumetric ratio of the porous metal ring increases, the cracks in the intermetallic compound will propagate in the aluminium alloy matrix at the boundary area between aluminium alloy matrix and the reinforced area with porous metal, resulting in the fall-out of the reinforced area from the piston body.

Moreover, there is another problem when the piston-ring groove is reinforced with the porous material. Even if the volume of the intermetallic compound is increased while keeping the volumetric ratio of the porous metal ring small, the wear resistance of the reinforced area is far less than the conventional Ni-resist ring carrier. In order to increase the wear resistance of the reinforced area with the porous metal to the acceptable level for heavy duty diesel engines, the volumetric ratio of the porous metal ring should be more than 20%. However, the reinforced area with such a high porous metal ratio can easily fall out from the piston, as mentioned already.

OBJECT AND SUMMARY OF THE INVENTION

Accordingly, it is an object of the present invention to increase the wear resistance of the piston ring groove by porous metal without making use of the intermetallic compound, and to offer the method to avoid cracking and falling-out of the reinforced area, so that the reinforcing method of the piston ring groove with the porous metal ring can be applied without failure for heavy duty engines.

Another object of the invention is to provide a piston for internal combustion engines which is excellent in machinability and wear resistance, so that it becomes easy to manufacture the piston, and further, the life of the engine can be prolonged.

In accordance with an aspect of this invention, an aluminium alloy piston for internal combustion engine is reinforced with a porous metal ring cast in through squeeze casting process, whereby at least the surface layer of the porous metal contains more than 10% chromium by weight and the layer thickness is more than 0.001 mm. The chromium containing layer suppresses the formation of the brittle intermetallic compound of aluminium and reinforcing metal, thus preventing from cracking in the intermetallic compound and increasing the wear resistance of the piston ring groove. The formation of the brittle intermetallic compound can be suppressed, whether chromium is contained only on the surface layer of the porous metal or chromium is contained uniformly in the porous metal. In order to increase the wear resistance of the reinforced piston ring groove, it is preferable that the chromium content is more than 15% by weight and that the thickness of the layer containing more than 15% chromium is bigger than 0.003 mm.

Whether chrome is contained only in the interface layer of the porous metal, or whether chrome is uniformly contained in the whole layer of the porous metal, it gives scarcely any influence on the formation of the intermetallic compound, but the more chrome is contained the better the abrasion resistance becomes, and it is preferable that the layer contains more than 15% Cr and is more than 0.003 mm in thickness. Further, the layer may contain 100% Cr.

It is preferable that the volumetric ratio $V_f$ of the porous metal falls between 10 to 60%. When $V_f$ is less than 10%, the abrasion resistance is scarcely improved, and when $V_f$ is more than 60%, it becomes difficult to completely fill the pores of the porous metal with aluminium unless the preheating temperature is raised. However, at the high preheating temperature, the undesirable compound of the porous metal with aluminium is apt to be produced in the interface part of the composite layer.

The porous metal may be either of carbon steel, alloy steel, nickel alloy or Monel metal, and chromium can be diffused in the porous metal through a chromizing process. In another case, chromium containing porous metal can be produced through powder metallurgy, e.g. using austenitic stainless steel powders. Further, the chromium layer can be plated on the porous metal.

BRIEF DESCRIPTION OF THE DRAWINGS

FIG. 9 is a diagram showing the thickness of a compound of iron with aluminium.

DETAILED DESCRIPTION OF PREFERRED EMBODIMENTS

Figure 1:
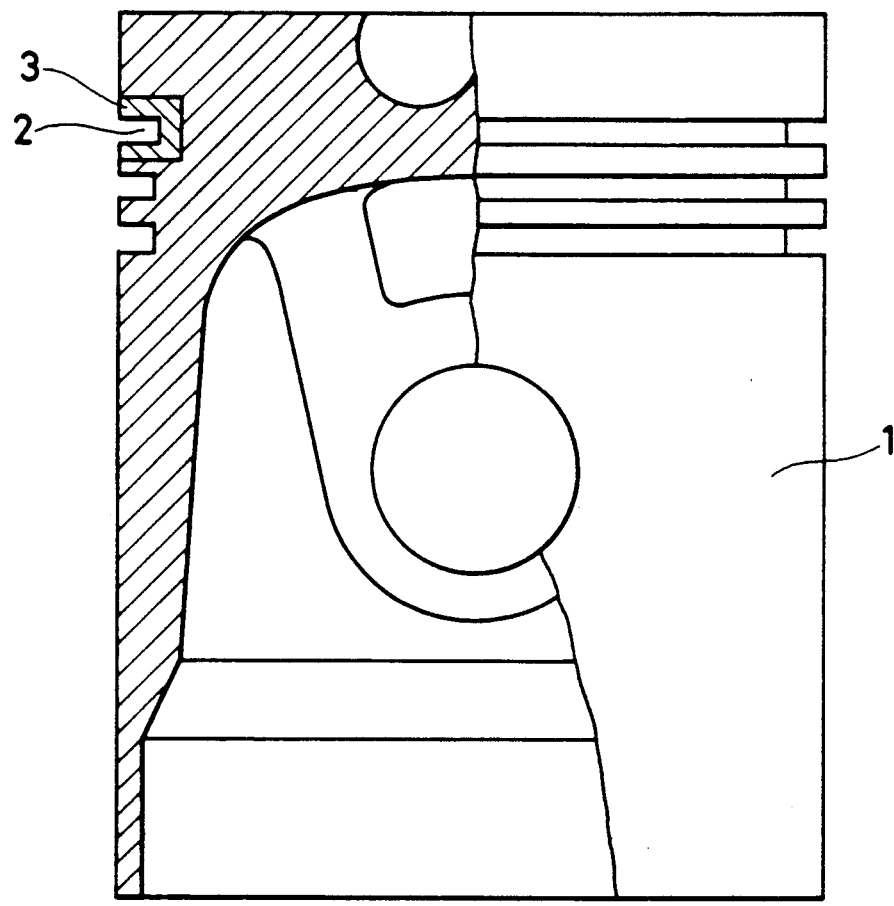
FIG. 1 is a front view, partly broken away and in section, of a piston made of aluminium alloy and used for internal combustion engines in which this invention is to be applied.

Referring to the drawings and initially to FIG. 1, a piston 1 has a top piston-ring groove 2 surrounded with a composite layer 3, whereby the piston-ring groove 2 is strengthened. The composite layer 3 comprises an annular member made of cellular nickel (manufactured by "Sumitomo-Denko" Co., Ltd. and identified by a registered trademark "Celmet"). The annular member is so formed by press work as to have a volumetric ratio $V_f$ of 30% after making composite with aluminium alloy. Further, another annular member is prepared, in which a cemented chrome layer of about 0.03 mm thickness is formed at a surface of the above annular member by means of chromizing.

The two kinds of annular members are positioned in respective molds. Molten aluminium alloy of a 740-degree centigrade temperature is poured into the respective molds, and then pressed under the pressure of 800 Kg/cm². Thus, each of the annular members becomes the composite layer 3 by penetration of aluminium alloy. The piston 1 made thereby receives a solid solution treatment at temperature of 495° C. for five hours, and an artificial aging at temperature of 200° C. for five hours. Thereafter specimens are cut out of the piston 1, and their microstructures are observed.

Figure 2:
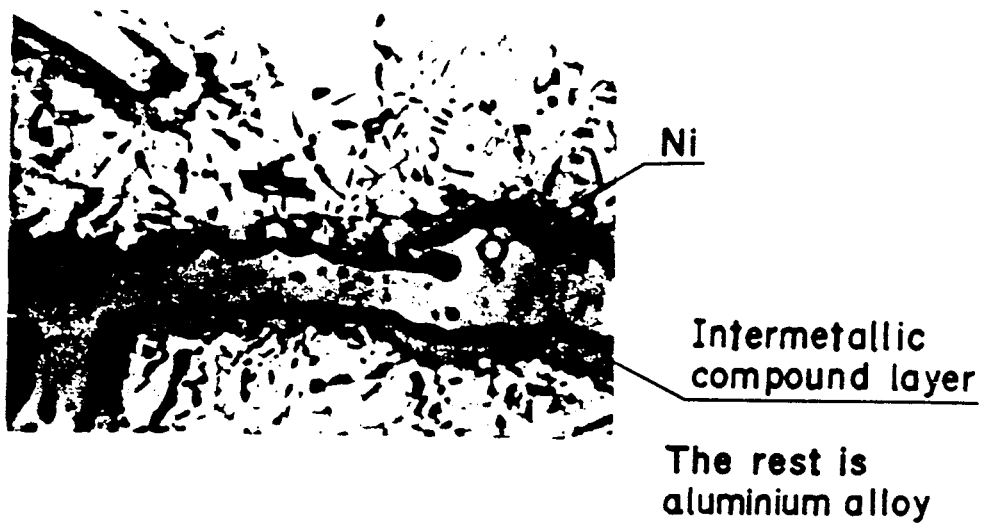
FIG. 2 is a micrograph of the reinforced ring groove area with a conventional porous metal of Nickel.
Figure 3:
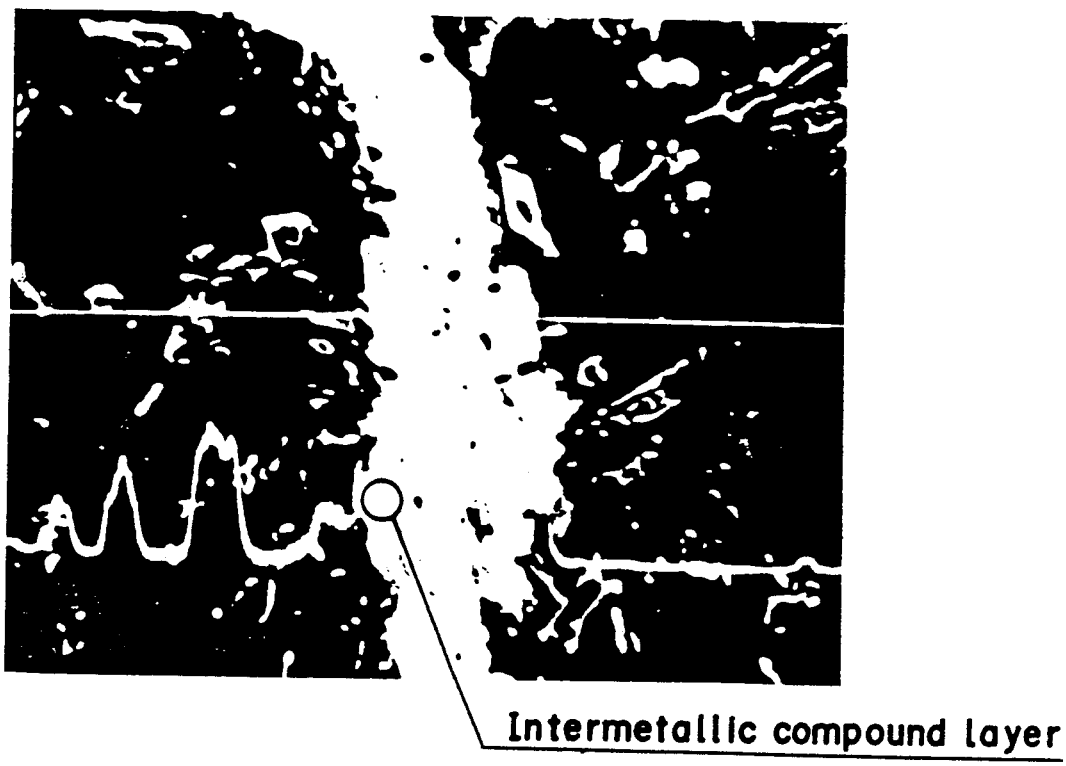
FIGS. 3 and 4 are photographs of an X-ray micro analizing of the reinforced ring groove area with a conventional porous nickel metal ring.
Figure 4:
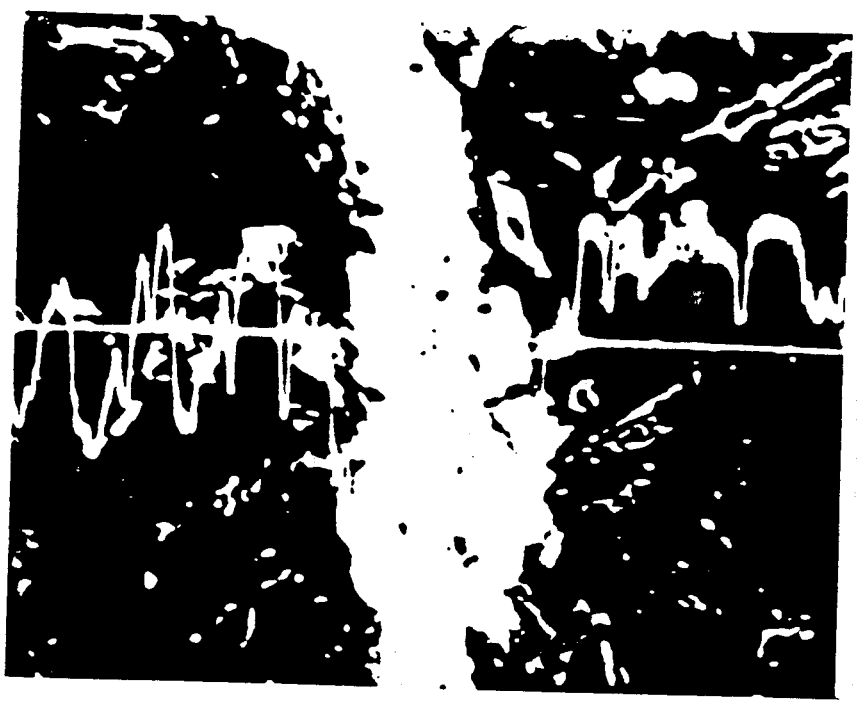

FIG. 2 is a micrograph of the composite layer 3, in which a reaction layer of nickel with aluminium has been formed. FIGS. 3 and 4 show results of quantitative analyses of nickel and aluminium observed with an X-ray analyser incorporated in a scanning type electron microscope. It will be seen from the results that there exists a pure nickel layer at the central part of the composite layer, but there is formed a compound layer of nickel with aluminium at the surface of the composite layer, since the amount of aluminium increases with the approach of the surface of the composite layer.

Figure 5:
FIGS. 5 through 7 are photographs of an X-ray micro analizing of the reinforced ring groove area with an embodiment of this invention.
Figure 6:
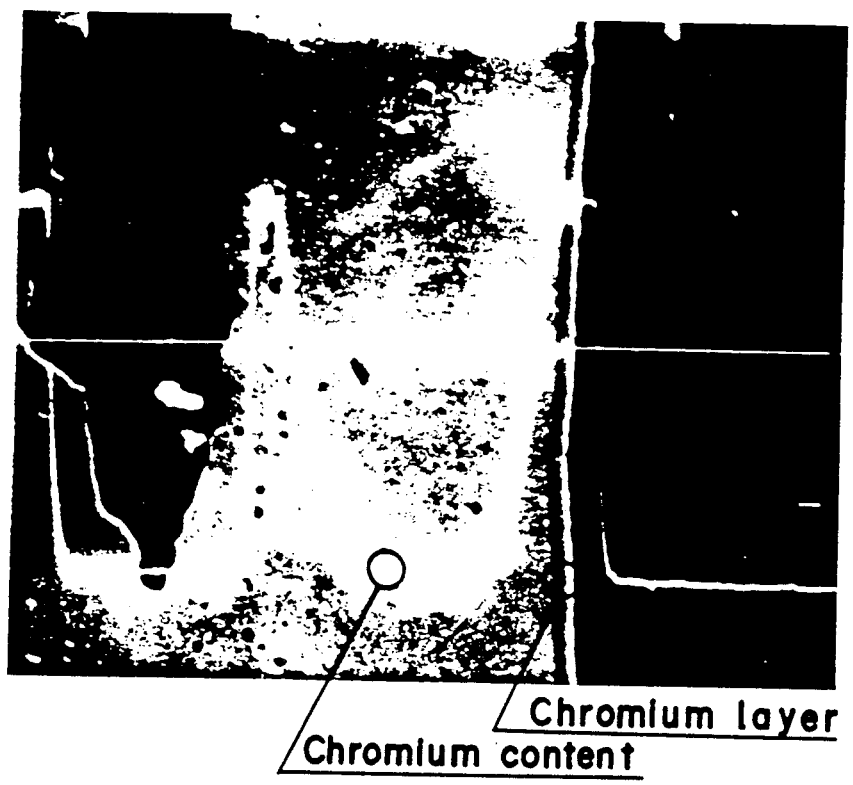
Figure 7:
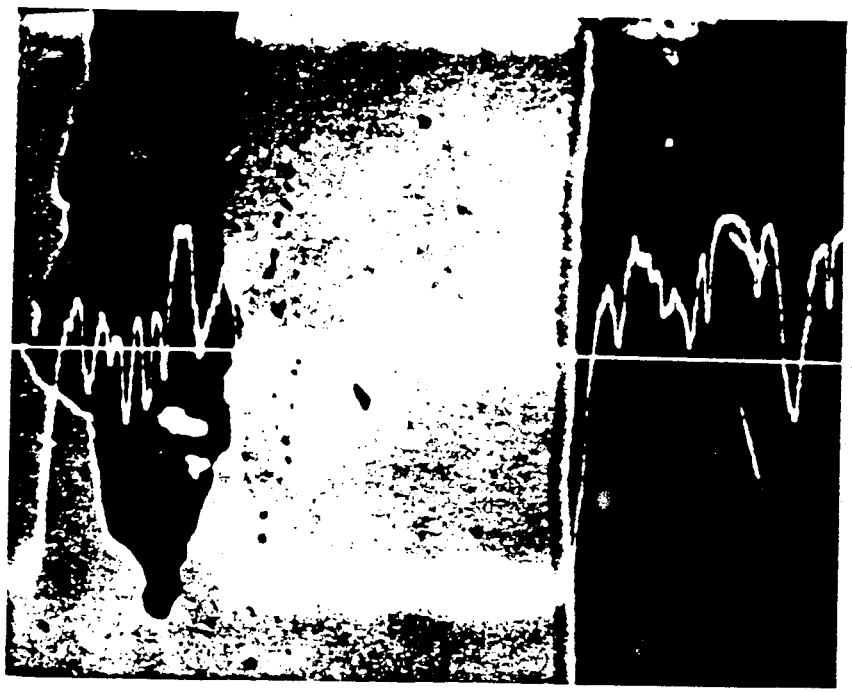

FIGS. 5 to 7 show results of observing, with the X-ray analyser, the composite layer comprising the other annular member, at the surface of which the cemented chrome layer of 0.003 to 0.005 mm thickness is formed by means of chromizing. It will be seen from the results that aluminium has not penetrated the inner part of the annular member due to formation of the chrome layer.

In the meanwhile, when an internal combustion engine is operated for five hundred hours under the alternation of full-load maximum speed running and non-load running to expose pistons of the engine to cyclic heat loads, cracks are apt to be initiated in an interface layer of the piston body of aluminium alloy, and the composite layer, the volumetric ratio $V_f$ of which is more than 20%. In tests described hereinafter, the cyclic heat loads are substituted by the alternation of heating the piston at temperature of 500° C., and being suddenly immersed in the water of normal temperature in order to simplify the tests.

Two pistons using the annular members of porous metal (one is chromized, and the other is not chromized) are compared by impregnating method, and it is found that the porous metal and the piston body of aluminium alloy are completely separated n their interface which is formed in the piston using the annular member not to be chromized, whereas there is no crack initiated in the piston using the annular member to have been chromized.

Figure 8:
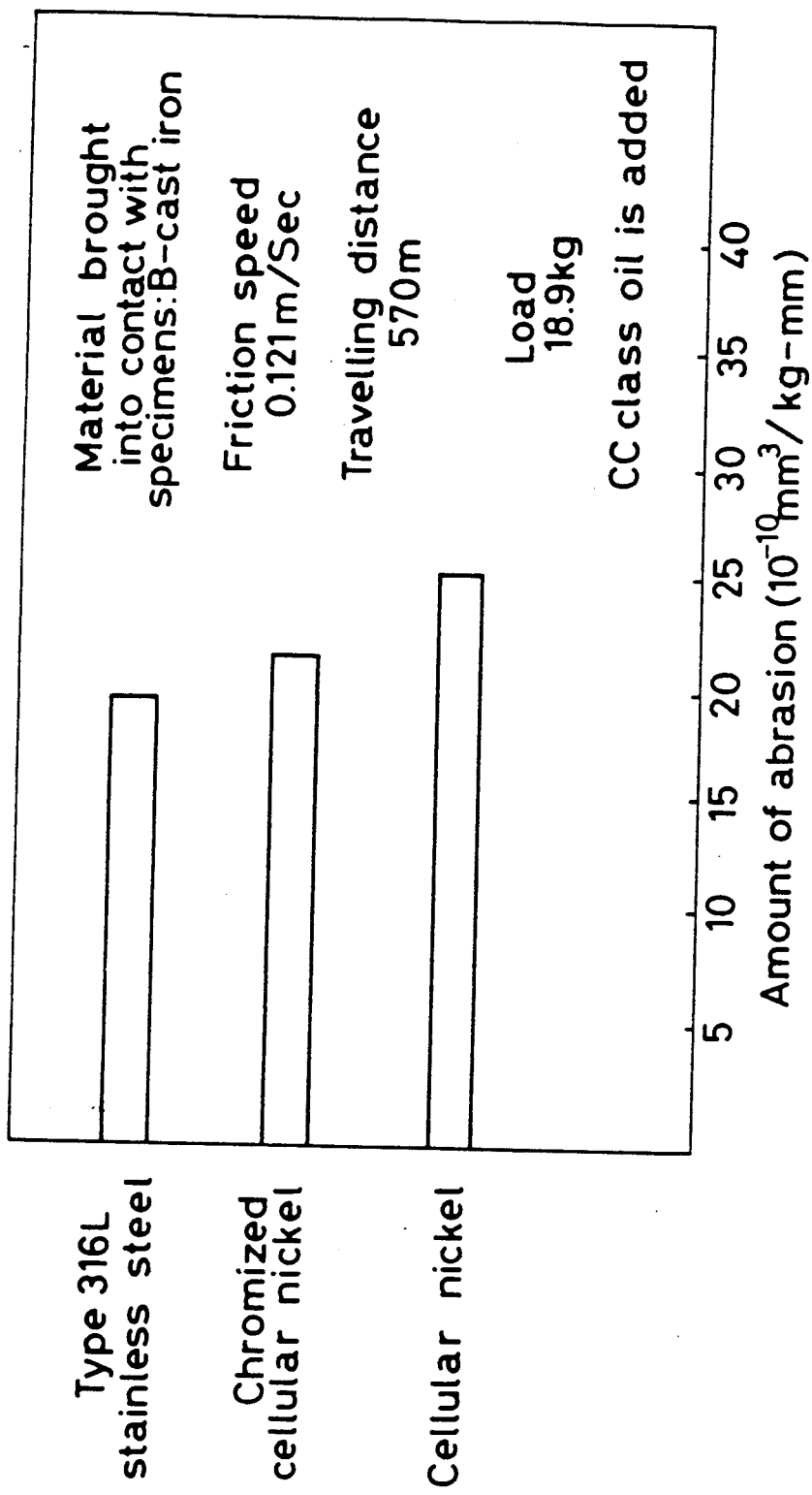
FIG. 8 is a diagram of the result of abrasion tests of pistons.

Moreover, the two pistons are tested by an Ogoshi's abrasion testing machine. According to FIG. 8 which shows the test results, it is found that the wear resistance of the piston using the annular member to have been chromized is improved.

THE SECOND EMBODIMENT

Another embodiment in which the porous metal is formed by sintering will be hereinafter described. Three kinds of mixtures obtained by adding 5%, 10% and 20% Cr to mild steel powder are heated to produce three kinds of sinters, the volumetric ratio $V_f$ of which is 50%. Three kinds of composite layers formed by means of pressure casting receive a solid solution treatment at temperature of 495° C. for five hours, and an artificial aging at temperature of 200° C. for five hours. Then, the thickness of a compound of iron with aluminium is measured, and a relation of the thickness to chrome contents is shown in FIG. 9.

After three repetitions of an alternation heated at temperature of 500° C., and suddenly immersed in the water of normal temperature, it is found that the composite layer and the piston body of aluminium alloy are separated in their interface which is formed in the piston using the sinter which contains no chrome, whereas there is no crack initiate in the piston using the sinter which contains 10% Cr.

THE THIRD EMBODIMENT

An additional abrasion test is made for a composite layer based on a cellular metal of type 316 stainless steel (containing 16 to 18% Cr), the volumetric ratio $V_f$ of which is 50%. According to a test result shown in FIG. 8, the composite metal of this type is less in amount of abrasion than that based on the member of cellular nickel, since its volumetric ratio $V_f$ is larger.

Moreover, after three repetitions of the alternation heated at temperature of 500° C., and suddenly immersed in the water of normal temperature, it is found that there is no crack initiated in the interface of the composite layer and the base portion of aluminium alloy.

Various modifications are possible within the scope of the appended claims, for example, the porous metal may be plated with chrome, or chrome may be uniformly contained in the porous metal, if the amount of chrome is more than 10%.

What is claimed is:

1. A piston for internal combustion engines, said piston comprising an aluminum alloy body and an annular member of porous metal embedded in said body by casting said aluminum alloy around said annular member under high pressure, said porous metal defining pores of said annular member, said annular member defining a piston-ring groove, said porous metal characterized by a volumetric ratio between 10% and 60%, said aluminum alloy having penetrated into said pores of said annular member as a result of said casting to thereby form a composite layer of said porous metal and said alloy, said composite layer having a surface layer defined by the region of said annular member adjacent said body, said surface layer comprising more than 10% chromium.

2. A piston according to claim 1, wherein said porous metal comprises nickel alloy.

3. A piston according to claim 1, wherein said porous metal comprises carbon steel or alloy steel.

4. A piston according to claim 1, wherein said surface layer has a thickness of more than 0.001 mm.

5. A piston according to claim 1, wherein said surface layer comprises more than 15% chromium and has a thickness of more than 0.003 mm.

6. A piston according to claim 1, wherein said porous metal comprises nickel or nickel alloy and said surface layer has a thickness of more than 0.001 mm.

7. A piston according to claim 1, wherein said porous metal comprises a sintered body of a mixed powder of mild steel and chromium.

8. A piston according to claim 1, wherein said porous metal comprises a sintered body of carbon or alloy steel comprising at least 10% chromium.

* * * * *